United States Patent Office

3,532,653
Patented Oct. 6, 1970

1

3,532,653
EPOXY ADHESIVE COMPOSITIONS CONTAINING AMINE HARDENER AND TERTIARY AMINE CATALYST
Thomas W. Smeal, Franklin Township, Westmoreland County, Pa., assignor to United States Steel Corporation, a corporation of Delaware
No Drawing. Continuation-in-part of application Ser. No. 633,701, Apr. 26, 1967. This application Feb. 27, 1969, Ser. No. 803,060
Int. Cl. C08g 51/04; C08d 3/04
U.S. Cl. 260—24          16 Claims

ABSTRACT OF THE DISCLOSURE

Epoxy-type adhesive compositions comprising glycidyl polyether of a dihydric phenol, filler, a flexibilizer and a curing agent, preferably, a mixture of a flexibilizing amine hardener and a rigidifying tertiary amine catalyst. Enhancement of special properties is obtained by admixing a silane or silicone adhesion promoter and/or a high-boiling coal-tar fraction. The compositions exhibit high strength in shear and peel over a wider temperature range than known epoxy-type adhesives.

---

This application is a continuation-in-part of application Ser. No. 633,701 filed Apr. 26, 1967, now abandoned.

BACKGROUND OF THE INVENTION

Field of the invention

This invention relates to modified epoxy compositions having application as adhesives hardening at room temperature with high tensile shear and peel strengths over a wide service-temperature range and relative insensitivity to dirty surfaces. More particularly, the invention relates to an epoxy-resin composition modified with filler and a flexibilizer and further modifiable with a silane or silicone adhesion promoter and/or a high-boiling coal-tar fraction. The compositions are cured at room temperature with a novel mixture of a flexibilizing hardener and a rigidifying catalyst.

Description of the prior art

Modified epoxy resin compositions are well known in the art and are described, for example, in U.S. Pats. Nos. 2,500,499, 3,033,088, and 3,062,771. Among the preferred resins are glycidyl polyethers of dihydric phenols having epoxy equivalencies greater than 1. The resins may be modified by fillers, high boiling oil fractions and a variety of other materials to enhance their properties. A great number of curing agents have been specified to solidify the compositions at room temperature. These prior art compositions, when used as adhesives, have good properties at ambient temperatures, but they lose most of their tensile and peel strengths at temperatures near the extremes of about −67° and 180° F. Room-temperature hardened polymers resistant to this temperature range are usually rigid and poor in resistance to peel stresses. Flexible polymers have good peel resistance but are not resistant to temperature extremes, especially elevated temperatures. Additionally, non-porous substrates, for example, metal sheets must be cleaned carefully before application of such adhesive compositions.

SUMMARY OF THE INVENTION

My invention provides epoxy-resin adhesives including a novel combination of chemical curing agents, relatively large amounts of specific mineral fillers and specific types and amounts of flexibilizers. Enhanced properties are obtained by also adding to the basic compositions small amounts of silane or silicone adhesion promoters and/or relatively large amounts of high-boiling coal-tar fractions.

More particularly, my compositions comprise between about 15% and 60% of a glycidyl polyether of a dihydric phenol having an epoxy equivalency greater than 1, about 25% to 70% of a filler such as talc, silica, dolomite, anhydrous calcium sulfate and aluminum silicate, about 1% to 7% of a flexibilizer such as poly(vinyl methyl ether), rosin ester, solid polyamide resin (i.e. the condensation product of an organic diamine and an organic dibasic acid such as the condensation product of hexamethylene diamine and adipic acid), or a copolymer of styrene and butadiene. A curing agent for the polyether comprises approximately a stoichiometric amount of a mixture of a flexibilizing amine hardener and a rigidifying tertiary amine catalyst as more particularly defined below. To this composition may be added between about 0.5% and 2% of a silane or silicone adhesion promoter and about 20% to 40% of a coal-tar fraction boiling between about 500° and 900° F. All percentages are by weight of the total composition including any additives.

The advantages of my compositions over prior art adhesives include:

(1) High tensile shear and peel strengths at temperature extremes. For tar-extended compositions this means temperatures from −67° to 180° F. For unextended compositions this means temperatures from far below −67° to 300° F. At the latter temperature, for example, shear strengths as great as 520 p.s.i. have been attained.

(2) Improvement in moisture resistance.

(3) Decreased sensitivity to dirty surfaces, chemically treated galvanized surfaces, moisture and some chemicals.

(4) Improved resistance to creep under static load.

DESCRIPTION OF THE PREFERRED EMBODIMENT

A preferred group of epoxy ethers useful in my invention is prepared by reacting a dihydric phenol with epichlorhydrin in alkaline solution. The products comprise ethereal oxygen and glycidyl groups in such quantity that the products have 1,2-epoxy equivalency in the average molecule greater than one. By epoxy equivalency, reference is made to the average number of 1,2-epoxy groups

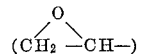

contained in an average molecule or the ether. The products are of resinous character and are either solid or liquid materials at normal temperature (20°–30° C.). Any of the various dihydric phenols may be used in preparing the glycidyl ethers, and which preferably contain only one or two benzene ring systems, for example, mononuclear phenols such as resorcinol, catechol, hydroquinone; polynuclear phenols such as bis-(4-hydroxyphenyl)-2,2-propane (bisphenol), 4,4′-dihydroxy benzophenone, bis-(4-hydroxyphenyl)-1,1-ethane, bis(4-hydroxyphenyl)-1,1 - isobutane, bis - (4 - hydroxyphenyl)-2,2-butane, bis-(4-hydroxy - 2 - methylphenyl)-2,2-propane, bis-(hydroxy-2-tertiarybutyl phenyl)-2,2-propane, bis - (2 - dihydroxynaphthyl)-methane, and 1,5-dihydroxy naphthalene. The products may be represented by the formula:

wherein $n$ is an integer, preferably from 0 to 7, and R represents a divalent hydrocarbon radical of a dihydric phenol. A preferred phenol is bis-phenol A, i.e. bis-(4-hydroxyphenyl)-2,2-propane. Preferred epoxy ethers for use in the invention are those having epoxy values no less than 0.20 (pyridinium chloride method), and melting points up to about 80° C. (Durran's mercury method). A glycidyl ether resin will contain at least one epoxy group and usually less than two per molecule. Epoxide equivalent weight is defined as the number of grams of resin containing one gram equivalent of epoxide. Successful adhesives were prepared with commercially available epoxy resins in the above classification, for example, Epotuf 37–139 (diglycidyl ether of bis-phenol A, epoxy equivalent 182 to 195, viscosity 5,000 to 10,000 centipoises) and Epotuf 37–140 (diglycidyl ether of bis-phenol A, epoxy equivalent 185 to 200, viscosity 10,000 to 19,000 centipoises), Epon 828 (diglycidyl ether of bis-phenol A, epoxy equivalent 185 to 192, viscosity 10,000 to 16,000 centipoises), ERL–2772 (diglycidyl ether of bis-phenol A, epoxy equivalent weight 175 to 185, viscosity 7,000 to 9,000 centipoises), ERL–2774 (diglycidyl ether of bis-phenol A, epoxy equivalent 180 to 195, viscosity 11,000 to 13,500 centipoises), Epi-rez 508 (molecularly distilled diglycidyl ether of bis-phenol A, epoxy equivalent weight 171 to 177, viscosity 3,600 to 5,500 centipoises), Epi-rez 510 (liquid diglycidyl ether of bis-phenol A, epoxy equivalent weight 180 to 200, viscosity 10,000 to 16,000 centipoises), DER 330 (diglycidyl ether of bis-phenol A, epoxy equivalent weight 182 to 189, viscosity 7,000 to 10,000 centipoises), and DER 331 (liquid diglycidyl ether of bis-phenol A, epoxy equivalent weight 186 to 192, viscosity 11,000 to 14,000 centipoises). All viscosities are at 25° C.

Preferred fillers for my adhesives have been found to be talc, silica (preferably ground to pass 200 mesh), dolomite (a mixture of calcium and magnesium carbonates), anhydrous calcium sulfate, and aluminum silicate. A balance of desirable properties is secured with a mixture of approximately equal parts by weight of dolomite and aluminum silicate.

Only a relatively few of a relatively large number of possible flexibilizers were found to improve low-temperature properties without degrading high-temperature properties. These flexibilizers are poly(vinyl methyl ether), rosin esters, solid polyamide resins and copolymers of styrene and butadiene. It is preferred that the poly(vinyl methyl ether) compounds have the formula

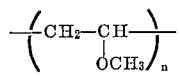

wherein: $n$ is about 1,000 to about 4,000; preferably 2,000. All of these compounds have a molecular weight of about 50,000 to about 200,000; preferably about 120,000. The effectiveness of poly(vinyl methyl ether) was unexpected in view of its water solubility. In the specification and claims it is to be understood that the term "flexibilizer" is for a commercially available material developed to impart flexibility to a resinous composition.

The prior art has proposed a relatively large number of room-temperature curing agents. For purposes of my invention, and in the specification and claims, some of such curing agents are classified as "flexibilizing" hardeners and "rigidifying" catalysts. Most primary and secondary amine hardeners have little "flexibilizing" action and are not useful in my invention.

The products resulting from the use of a flexibilizing hardener as opposed to a rigidifying catalyst would appear to be quite dissimilar, since the flexibilizing hardeners combine with the epoxy resins in addition-type reactions to give flexible, tough products having little heat resistance. On the contrary, rigidifying catalysts usually do not enter into the reaction but serve to open the epoxy rings to permit epoxy to epoxy bonding. The products are very hard and rigid with excellent heat resistance. Surprisingly and quite unexpectedly, I have found synergism in combining a flexibilizing hardener and a rigidifying catalyst, since the desirable properties thereof were retained and the undesirable properties thereof were overcome. Preferred are flexibilizing primary polyamine hardeners having a chain of 3 to 16 carbon groups with 2 to 5 carbon atoms per group, an ether link between the groups and an amine group on each end of the chain (e.g. liquid glycol diamines having the general formula $$H_2N(CH_2)_3O(C_nH_{2m}O)_x(CH_2)_3NH_2$$

wherein $n$ has a value of 2 to 5 inclusive and $x$ has a value of 1 to 14 inclusive. For example, suitable liquid glycol diamines are those wherein when $n$ has a value of 2, $x$ has a value of 11, and when $n$ has a value of 5, $x$ has a value of 7. The liquid glycol diamines have a molecular weight of less than about 800. Examples of preferred hardeners are liquid glycol di- and tri-amines having the formulae

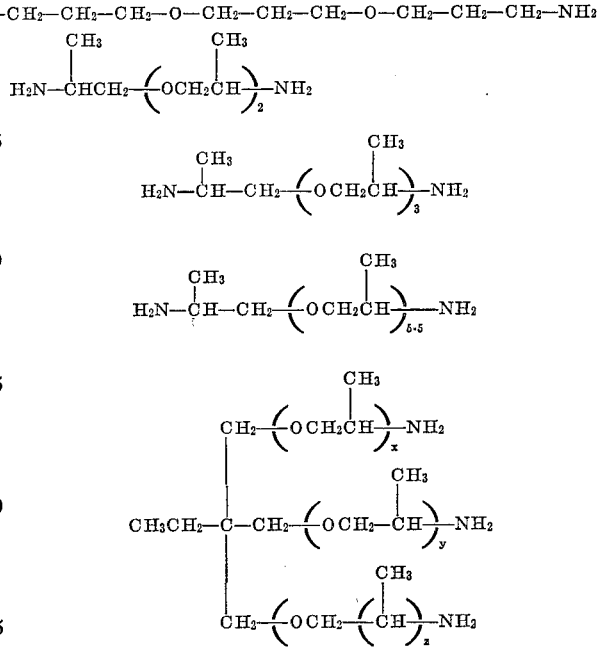

wherein $x+y+z=5.3$.

Preferred were rigidifying tertiary amine catalysts such as tri(dimethyl amino methyl) phenol(dimethyl amino methyl phenol and benzyldimethylamine. These catalysts are commercially available respectively as DMP–30, DMP–10 and BDMA. It is necessary that the tertiary amine catalyst have at least 6 carbon atoms, and it is preferred that the tertiary amine catalyst have 6 to 20 carbon atoms, the most preferred tertiary amines are those that boil above about 85° C. Relative to the epoxy resin an approximately stoichiometric or equivalent amount of curing agent mixture gives satisfactory results; broadly, between about 0.90 and 1.10 and preferably between about 1.00 and 1.05 times the stoichiometric amount of a mixture. It has been found that the relative proportions of hardener and catalyst in the mixture are extremely critical. For example, a stoichiometric amount of a flexibilizing primary polyamine hardener produced an adhesive weak at 77° F. and higher temperatures, but with excellent low-temperature peel strength. Replacing about 30% to 50% of the hardener with a stoichiometrically equivalent amount of a rigidifying tertiary amine catalyst greatly improved the adhesive strength at 77° F. and above, without significantly lowering the low-temperature peel strength. This is quite surprising, since it would be expected that the low-temperature peel strength would gradually decline as the proportion of catalyst increases. It has been found, however, that low-temperature peel strength is relatively unaffected until about 50% replacement with catalyst. Thereafter, this strength deteriorates quite rapidly and is practically non-existent with about a 60% replacement. It has been found that the curing agent mixture may be between about 70% and 50% hardener and 30% and 50% catalyst, preferably between about 67% and 60% hardener and 33% and 40% catalyst.

A stoichiometric amount of hardener is defined as the amount supplying exactly one active hydrogen for each epoxy group in a given mass of resin. Actually, there is no corresponding stoichiometric amount for a catalyst. There are, however, manufacturers' recommendations for an amount to provide an adequate degree of curing within a reasonable period of time. In the specification and claims such amounts are considered "equivalent" or "stoichiometric."

It has been found that the broad limits for a basic adhesive composition comprises in percent by weight between about 15% and 60% resin, between about 25% and 70% filler, between about 1% and 7% flexibilizer, between about 0.5% and 14% flexibilizing amine hardener and between about 0.3% and 3% rigidifying tertiary amine catalyst. Preferably, a composition comprises between about 18% and 50% resin, between about 30% and 60% filler, between about 2% and 5% flexibilizer, between about 2.5% and 11% hardener and between about 0.5% and 2% catalyst.

It has been found that the hereinabove described compositions may be improved by the addition of other materials. The above compositions show improved strength properties, moisture resistance and handling properties by the addition thereto of relatively small amounts of certain silanes or silicones. In the specification and claims, reference will be made to those silanes and silicones which are commercially available materials, developed specifically as adhesion promoters, as silane and silicone adhesion promoters. Broadly useful additions are between about 0.2% and 2% by weight. The preferred range is between about 0.4% and 1.2%. Useful commercially available materials include Silane A–1100 (gamma-aminopropyl-triethoxysilane), Silane A–186 (3,4-epoxy-cyclohexyl-ethyl-trimethoxysilane), Silane A–187 (glycidoxypropyl-trimethoxysilane) and Paint Additive 21. The latter is designated a silicone by the manufacturer, e.g. N-beta-(aminoethyl) - gamma - aminopropyltrimethoxysilane $[NH_2CH_2CH_2NH(CH_2)_3Si(OCH_3)_3]$ in n-butyl alcohol.

The above basic compositions with or without the addition thereto of silane or silicone adhesion promoters, become surprisingly insensitive to dirty and to galvanized surfaces, and more moisture resistant and tacky when there is added thereto a relatively large amount of a coal-tar fraction, boiling between about 500° and 900° F., more preferably, boiling between about 670° and 850° F. Additions may be between about 20% and 40% by weight of the total composition, more preferably between about 25% and 30% of the total composition or from 1.1 to 1.7 times the weight of epoxy resin in the composition. Coke oven derived coal tar is preferred. The useful boiling range corresponds to that of a so-called heavy creosote fraction.

A complete understanding of the invention may be obtained from the following typical examples of process showing how the compositions are made and some of the properties thereof. The designated properties were determined by standard ASTM methods, more particularly D1002–53T (tensile shear strength), D903–49 (peel strength) and D1781–60T (climbing drum peel strength).

EXAMPLES 1 TO 4

Epotuf 37–139 is a commercially available liquid epoxy resin, a condensation product of bisphenol A and epichlorohydrin, with an epoxide equivalent of 182–195. The flexibilizing primary polyamine hardener employed has the formula

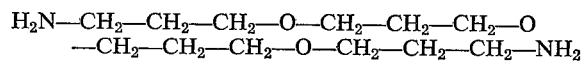

and is employed in an amount of about 30 parts by weight per 100 parts of resin. A commercially available rigidifying tertiary amine catalyst is DMP–30 [tri(di-methyl amino methyl) phenol], the stoichiometric or equivalent amount thereof being about 10 parts per 100 parts resin, by weight. Paint Additive 21 is a commercially available silicone adhesion promoter, e.g. N-beta-(aminoethyl) - gamma - aminopropyltrimethoxysilane $[NH_2CH_2CH_2NH(CH_2)_3Si(OCH_3)_3]$ n-butyl alcohol.

In Example 1, with a high-shear mixer, at about 150° F., there were admixed in parts by weight or percent by weight, 35.4 parts Epotuf 37–139, 2.9 parts of a flexibilizer, poly(vinyl methyl ether), 23.6 parts of dolomite, grade AA filler and 29.4 parts aluminum silicate, grade ASP–400 filler. There were then blended into this mixture 0.9 part Paint Additive 21, 6.4 parts.

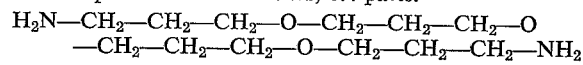

hardener and 1.4 parts DMP–30 catalyst. These weights represented a stoichiometric amount of curing agent, in a ratio of 60% hardener and 40% catalyst. The resulting composition was used to make test samples which were hardened at ambient temperatures for 7 days. The test results from Examples 1 to 11 are tabulated in Table 1.

In the examples grouped in Tables 1 and 2, the preparation of the compositions and the weight of the constituents were maintained constant as nearly as possible, usually with a change in weight of a single constituent to illustrate the effect thereof in the resulting properties. Example 1, representing a preferred composition with a 60:40 ratio of hardener to catalyst, was repeated as Examples 2 to 4 to illustrate the relatively narrow range of hardener to catalyst ratios which provide vastly and unexpectedly improved adhesive properties. More particularly, in Example 2, with a 50:50 ratio, the peel strength at 180° F. and the climbing drum results were poorer than in Example 1. In Example 3, with a 75:25 ratio, the tensile shear strength at 180° F. was poorer. In Example 4, with a 67:33 ratio, some properties were somewhat better, others poorer.

EXAMPLES 5 AND 6

Example 1 was repeated as Examples 5 and 6 to illustrate the effect on the composition of a change in the amount of filler. More particularly, in Example 5, while maintaining the dolomite to silicate ratio, the total weight of filler was decreased about 50% with respect to Example 1, with the result that the tensile shear strength at 180° F. and the climbing drum peel strength were somewhat poorer than in Example 1. In Example 6 a 50% increase in filler resulted in somewhat poorer properties, generally.

EXAMPLES 7 TO 9

Example 1 was repeated as Examples 7 to 9 to illustrate the effect on the composition of the amount of flexibilizer used. In Example 7, doubling the amount of poly(vinyl methyl ether) did not alter the properties appreciably over Example 1. In Example 8, increasing the amount of poly(vinyl methyl ether) to 8.3% by weight affected adversely the tensible shear strength at 180° F. and the climbing drum peel strength. In Example 9 when the flexibilizer was omitted, almost all properties were greatly affected.

EXAMPLES 10 AND 11

Example 1 was repeated as Examples 10 and 11 to illustrate the effect on the composition of the amount of silicone adhesion promoter used. In Example 10, the total weight of adhesion promoter was decreased by 50% over Example 1, with the result that the tensile shear strength at 180° F. and the climbing drum peel strength were poorer than in Example 1. In Example 11, a 50% increase in the weight of adhesion promoter resulted in the same properties being poorer.

EXAMPLES 14 TO 17

In the folowing examples the compounds indicated in the table are rapidly mixed by first premixing the epoxy resin, fillers and additives except for the catalyst mixture. After thorough mixing of the above components, a mixture of the catalyst of the invention, as more particularly disclosed in the table below, is added with thorough mixing. The resulting adhesive is then applied to clean carbon steel and the lap shear, peel strength and climbing drum peel strengths are obtained after curing the adhesive for one week at ambient temperature.

TABLE 1

| Examples | 1 | 2 | 3 | 4 | 5 | 6 | 7 | 8 | 9 | 10 | 11 |
|---|---|---|---|---|---|---|---|---|---|---|---|
| Resin | 35.4 | 35.8 | 35.0 | 35.2 | 46.3 | 27.3 | 34.3 | 33.4 | 36.4 | 34.5 | 34.1 |
| Flexibilizer | 2.9 | 2.9 | 2.9 | 2.9 | 7.7 | 9.1 | 5.7 | 8.3 | 0.0 | 5.7 | 5.7 |
| Filler, dolomite | 23.6 | 23.9 | 23.3 | 23.5 | 15.4 | 27.3 | 22.9 | 22.3 | 24.3 | 23.0 | 22.7 |
| Filler, aluminum silicate | 29.4 | 29.6 | 29.2 | 29.3 | 19.3 | 34.1 | 28.6 | 27.8 | 30.4 | 28.7 | 28.4 |
| Adhesion promoter | 0.9 | 0.9 | 0.9 | 0.9 | 1.2 | 0.7 | 0.9 | 0.8 | 0.9 | 0.4 | 1.7 |
| Hardener | 6.4 | 5.2 | 7.9 | 7.0 | 8.3 | 4.9 | 6.2 | 6.0 | 6.6 | 6.2 | 6.1 |
| Catalyst | 1.4 | 1.7 | 0.9 | 1.2 | 1.9 | 1.1 | 1.4 | 1.3 | 1.5 | 1.4 | 1.4 |
| Stoichiometric ratio-hardener/catalyst in percent | 60-40 | 50-50 | 75-25 | 67-33 | 60-40 | 60-40 | 60-40 | 60-40 | 60-40 | 60-40 | 60-40 |
| Tensile shear strength, p.s.i. at— | | | | | | | | | | | |
| −67° F | 3,185 | 2,746 | 3,190 | 3,346 | 2,866 | 2,678 | 2,956 | 2,844 | 2,388 | 2,920 | 2,830 |
| 180° F | 2,336 | 2,010 | 816 | 2,926 | 1,178 | 1,472 | 2,495 | 1,552 | 2,416 | 1,808 | 1,006 |
| Peel strength (180°), p.p.i. at— | | | | | | | | | | | |
| −67° F | 44.5 | 35.2 | 27.0 | 34.5 | 51.7 | 39.0 | 47.4 | 54.4 | 20.0 | 50.4 | 54. |
| 180° F | 15.9 | 11.6 | 22.8 | 24.8 | 14.5 | 16.8 | 12.7 | 19.4 | 7.5 | 19.6 | 18. |
| Climbing drum peel strength, p.p.i. at 77° F | 23.7 | 12.7 | | | 10.6 | 10.0 | 26.5 | 9.7 | 7.0 | 10.0 | 15. |

EXAMPLES 12 AND 13

In Example 12, in a high-shear mixer, at about 150° F., there were admixed in parts by weight or percent by weight, 20.24 parts Epotuf 37–139 resin, 28.67 parts of a coal-tar creosote fraction, boiling between about 670° and 845° F., 3.37 parts poly(vinyl methyl ether) flexibilizer, 0.5 parts Paint Additive 21, 23.61 parts each of dolomite and aluminum silicate fillers. Into the above composition, totalling 100 parts or percent, there were blended 4.01 parts of

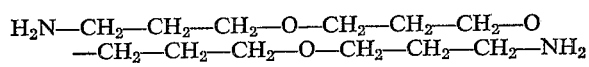

as a flexibilizing hardener and 0.89 part of DMP-30, as a rigidifying catalyst. This represented a stoichiometric amount of curing agent in a 60:40, hardner-catalyst ratio. The resulting composition was used to make test samples, the test results being tabulated in Table 2. For comparison and as Example 13, test samples were made with an Example 1 composition. Example 12, when compared with Example 13, illustrates the increase in moisture resistance and the greater ability to adhere to metal surfaces, more particularly, to metal surfaces that have not been cleaned as ordinarily required. These improvements are obtained when there is added to an epoxy adhesive composition a relatively large amount of a preferred coal-tar fraction.

TABLE 2

| Example No | 12 | 13 |
|---|---|---|
| Tensile shear: | | |
| Strength, p.s.i. at— | | |
| −67° F | 2,590 | 3,000 |
| 77° F | 3,040 | 3,000 |
| Peel strength (180°) p.p.i. at— | | |
| −40° F | 29.5 | 50.1 |
| 77° F | 28.0 | 27.0 |
| Climbing drum peel strength, p.p.i. at 77° F | 38.0 | 26.5 |
| Tensile shear strength at 77° F, p.s.i.: | | |
| After 7 days in water | 3,040 | 2,000 |
| On carbon steel as received from mill | 2,220 | 2,000 |
| On galvanized steel as received from mill | 2,520 | 2,790 |
| On alkaline-cleaned galvanized steel | 2,620 | 2,890 |

| | Example | | | |
|---|---|---|---|---|
| Component | 14 | 15 | 16 | 17 |
| A | 20.2 | | | |
| B | | 28.8 | | |
| C | | | 43.2 | |
| D | | | | 25.2 |
| E | 4.8 | 4.8 | 4.8 | 4.8 |
| F | 3.0 | 3.0 | 3.0 | 3.0 |
| G | 10.0 | 10.0 | 10.0 | 10.0 |
| H | 87.6 | 87.6 | 87.6 | 87.6 |
| I | 2.9 | 2.9 | 2.9 | 2.9 |
| J | 120.0 | 120.0 | 120.0 | 120.0 |
| Lap shear, p.s.i., at— | | | | |
| −67° F | 4,555 | 4,955 | 5,625 | 3,926 |
| 77° F | 3,326 | 3,650 | 3,988 | 3,156 |
| 180° F | 3,000 | 2,438 | 1,448 | 3,144 |
| 180° peel, p.p.i., at— | | | | |
| −67° F | 12.5 | 46.2 | 50.8 | 32.5 |
| 77° F | 30.9 | 25.4 | 26.6 | 34.0 |
| 180° F | 21.1 | 19.1 | 19.4 | 17.8 |
| Climbing drum, peel at 77° F., i.p.p.i. | 25.4 | 29.7 | 31.5 | 27.0 |

In the foregoing table, the compounds employed are as follows:

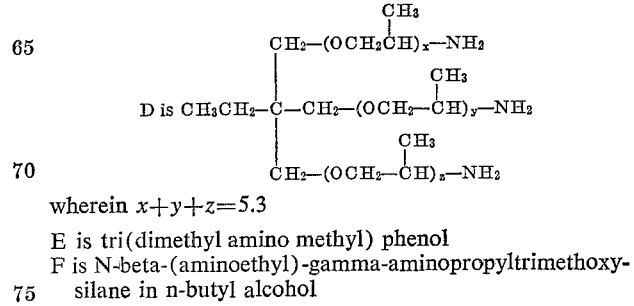

wherein $x+y+z=5.3$

E is tri(dimethyl amino methyl) phenol

F is N-beta-(aminoethyl)-gamma-aminopropyltrimethoxysilane in n-butyl alcohol

G is poly(vinyl methyl ether) having a molecular weight of about 120,000

H is 325 mesh talc

I is the reaction product of dodecyl amine with anhydrous aluminum silicate (bentonite) prepared as in Example 2 of U.S. Pat. No. 2,531,427

J is the condensation product of bis phenol A with epichlorohydrin havnig an epoxide equivalent of 182 to 195 as employed in Example 1

EXAMPLES 18 TO 22

The following examples illustrate the importance of the hardener: catalyst ratio of 70/30 to 50/50. It is only when the hardener-catalyst ratio is in this range that a heterogeneous resinous matrix composed of two complete systems is formed, one of which is flexible and composed of the addition product of the hardener and epoxy resin, the other being rigid and composed of epoxy resin molecules linked through epoxy to epoxy bonds formed via the action of the catalyst. Note that the catalyst does not become a part of the resin matrix. The flexible system combined with the rigid system provides far greater peel strength and heat resistance than could be expected from either alone. Examples 18 to 22 are summarized in the following table in which all of the components except for the catalyst mixture are premixed and then combined with rapid stirring prior to being coated on clean carbon steel. The lap shear, peel strength and the climbing drum peel strength are then measured after a one week cure at ambient temperature.

| Component | Examples | | | | |
|---|---|---|---|---|---|
| | 18 | 19 | 20 | 21 | 22 |
| A | 12.0 | 12.0 | 12.0 | 12.0 | 12.0 |
| B | 1.0 | 1.0 | 1.0 | 1.0 | 2.0 |
| C | 8.0 | 8.0 | 8.0 | 8.0 | 8.0 |
| D | 10.0 | 10.0 | 10.0 | 10.0 | 10.0 |
| E | 0.3 | 0.3 | 0.3 | 0.3 | 0.3 |
| F | 3.6 | 2.7 | 2.4 | 2.2 | 1.8 |
| G | 0.0 | 0.3 | 0.4 | 0.5 | 0.6 |
| Ratio F/G | 100/0 | 75/25 | 67/33 | 60/40 | 50/50 |
| Lap shear, p.s.i., at— | | | | | |
| −67° F | 3,394 | 3,190 | 3,346 | 3,185 | 2,746 |
| 180° F | 820 | 816 | 2,926 | 2,336 | 2,010 |
| 180° peel, p.p.i., at— | | | | | |
| −67° F | 28.0 | 27.0 | 34.5 | 44.5 | 35.2 |
| 180° F | 17.8 | 22.8 | 24.2 | 15.9 | 11.6 |
| Climbing drum peel at 77° F | | | | 23.7 | 12.7 |

In the foregoing table:

A is the epoxy resin employed in Example 1
B is the poly,(vinyl methyl ether) employed in Example 14
C is dolomite
D is aluminum silicate, grade ASP 400
E is $NH_2CH_2CH_2NH(CH_2)_3Si(OCH_3)$ in n-butyl alcohol
F is $H_2N-CH_2-CH_2-CH_2-(O-CH_2-CH_2-CH_2)_3-NH_2$
G is tri(dimethyl amino methyl) phenol.

The composition of Example 21 was subjected to outdoor exposure for a period of 36 months in order to show improved resistance of the adhesives of this invention to the phenomenon of creep normally associated with ambient temperature cured epoxy resin compositions. The time to failure at 533 p.s.i. static load had not been reached after 36 months with the product of Example 21, whereas a conventional ambient temperature epoxy adhesive failed in less than 2 weeks under the same conditions. The test consists of exposure to outside weather in a frame with a fulcrum arm allowing dead weight loads to be applied. Lap shear specimens having 2.25 square inches of joint area were made using cleaned steel and the load was applied after ambient temperature cure for 7 days.

EXAMPLES 23 TO 26

The following examples illustate the use of a silane adhesion promoter. These examples are carried out in a fashion similar to that of the preceding examples, i.e. the components are mixed except for the catalyst mixture and then the catalyst mixture is combined and the components are applied to a clean carbon steel substrate and allowed to cure for one week at ambient temperature.

| Component | Example | | | |
|---|---|---|---|---|
| | 23 | 24 | 25 | 26 |
| A | 12.0 | 12.0 | 12.0 | 12.0 |
| B | 7.5 | 7.5 | 7.5 | 7.5 |
| C | 7.2 | 7.3 | 7.4 | 7.3 |
| D | 0.5 | 0.5 | 0.5 | 0.5 |
| E | 2.16 | 2.16 | 2.16 | 2.16 |
| F | 0.48 | 0.48 | 0.48 | 0.48 |
| G | 0.3 | | | |
| H | | 0.12 | 0.08 | 0.16 |
| Lap shear, p.s.i., at 77° F | 3,276 | 2,816 | 2,900 | 2,986 |

In the foregoing example:

A is the epoxy resin of Example 1
B is dolomite, grade AA
C is aluminum silicate, grade ASP 400
D is the reaction product of dodecyl amine with anhydrous aluminum silicate (bentonite) prepared as in Example 2 of U.S. Pat. No. 2,531,427
E is $H_2N-CH_2-CH_2-CH_2-(O-CH_2-CH_2-CH_2)_3-NH_2$
F is tri(dimethyl amino methyl) phenol
G is $NH_2CH_2CH_2NH(CH_2)_3Si(OCH_3)$ in n-butyl alcohol
H is gamma-aminopropyltriethoxysilane In all of the foregoing examples, the parts are by weight unless otherwise specifically indicated.

It will be evident from the foregoing that my invention provides novel compositions. While these compositions are primarily adhesives, they are also useful for protective coating, paving, casting and laminating operations.

Although I have disclosed herein the preferred practice of my invention, I intend to cover as well any change or modification therein which may be made without departing from the spirit and scope of the invention.

I claim:

1. A composition comprising between about 15% and 60% by weight of a glycidyl ether of a dihydric phenol said glycidyl ether having an epoxy equivalency greater than 1, between about 25% and 70% by weight of a filler chosen from the group consisting of talc, silica, dolomite, anhydrous calcium sulfate, aluminum silicate and mixtures thereof, between about 1% and 7% by weight of a flexibilizer chosen from the group consisting of poly (vinyl methyl ether), rosin ester, solid polyamide resin and a copolymer of styrene and butadiene, and a curing agent for said glycidyl ether comprising a mixture of a flexibilizing amine hardener having 3 to 16 carbon groups of 2 to 5 carbon atoms per group, an ether link between the groups and 2 to 3 primary amine groups, and a rigidifying tertiary amine catalyst having 6 to 20 carbon atoms and a boiling point above about 85° C., said mixture being approximately in a stoichiometric amount, and in a stoichiometric proportion thereof between about 70% and 50% of said hardener and between about 30% and 50% of said catalyst.

2. A composition as defined in claim 1 characterized by said glycidyl ether comprising between about 18% and 50% by weight, said filler comprising between about 30% and 60% by weight, said flexibilizer comprising between about 2% and 5% by weight and said curing agent comprising between about 5% and 11% by weight of said hardener and between about 1% and 2% by weight of said catalyst.

3. A composition as defined in claim 1 characterized by said composition including an adhesion promoter chosen from the group consisting of silicone and silane adhesion promoters, said promoter comprising between about 0.5% and 2% by weight of the composition.

4. A composition as defined in claim 1 characterized by said composition including a coal-tar fraction boiling between about 500° F. and 900° F., said fraction comprising between about 20% and 40% by weight of the composition.

5. A composition as defined in claim 4 characterized by said coal-tar fraction boiling between about 670° and 850° F. and comprising between about 25% and 30% by weight of said composition.

6. A composition as defined in claim 1 characterized by said filler comprising between about 30% and 60% by weight of said composition in a proportion between about 25% and 50% dolomite and between about 75% and 50% aluminum silicate.

7. A composition as defined in claim 1 characterized by said flexibilizer comprising between about 2% and 5% by weight of poly(vinyl methyl ether).

8. A composition as defined in claim 1 characterized by said hardener having the formula $$H_2N(CH_2)_3O(C_nH_{2n}O)_x(CH_2)_3NH_2$$

wherein $n$ has a value of 2 to 5 inclusive and $x$ has a value of 1 to 14 inclusive.

9. A composition as defined in claim 1 characterized by said hardener having the formula

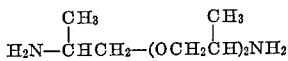

10. A composition as defined in claim 1 characterized by said hardener having the formula

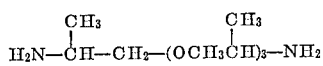

11. A composition as defined in claim 1 characterized by said hardener having the formula

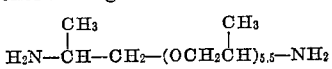

12. A composition as defined in claim 1 characterized by said hardener having the formula

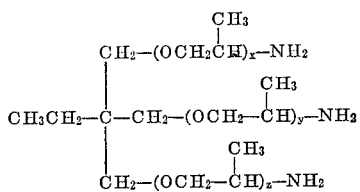

wherein $x+y+z=5.3$.

13. A composition as defined in claim 1 wherein said tertiary amine catalyst is tri(dimethyl amino methyl) phenol.

14. A composition as defined in claim 1 wherein said tertiary amine catalyst is dimethyl amino methyl phenol.

15. A composition as defined in claim 1 wherein said tertiary amine catalyst is benzyldimethylamine.

16. The composition of claim 1 wherein said hardener has the formula

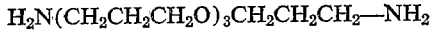

References Cited

UNITED STATES PATENTS

| | | | |
|---|---|---|---|
| 3,105,771 | 10/1963 | Simpson et al. | 260—18 |
| 3,297,622 | 1/1967 | Grosner et al. | 260—24 |
| 3,380,941 | 4/1968 | Ditman et al. | 260—18 |

OTHER REFERENCES

Skeist: Handbook of Adhesives, 1962; pp. 327–29; Sci. Lib., TP 968 S5.

MORRIS LIEBMAN, Primary Examiner

L. T. JACOBS, Assistant Examiner

U.S. Cl. X.R.

260—37, 834, 836

UNITED STATES PATENT OFFICE
CERTIFICATE OF CORRECTION

Patent No. 3,532,653                                                October 6, 1970

Thomas W. Smeal

It is certified that error appears in the above identified patent and that said Letters Patent are hereby corrected as shown below:

Column 2, line 53, after "molecule" "or" should read -- of --. Column 4, lines 53 to 55, the lower portion of the formula should appear as shown below:

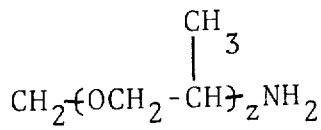

line 59, "phenol(dimethyl" should read -- phenol, dimethyl --. Column 6, line 21, before "n-butyl" insert -- in --; line 28, "parts." should read -- parts --. Columns 7 and 8, TABLE 1, Example 11, line 11, "54." should read -- 54.0 --; line 12, "18." should read -- 18.9 --; same table, same example 11, line 13, "15." should read -- 15.5 --. Column 7, line 51, "hardner" should read -- hardener --. Column 8, line 2, "compounds" should read -- components --. Column 11, lines 33 to 35, the formula should appear as shown below:

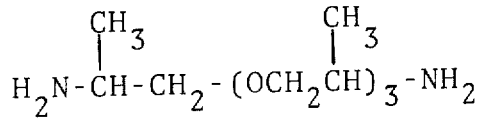

Signed and sealed this 20th day of April 1971.

(SEAL)
Attest:

EDWARD M. FLETCHER, JR.                              WILLIAM E. SCHUYLER, JR.
Attesting Officer                                     Commissioner of Patents